Dec. 15, 1942.　　C. S. KASPER　　2,305,167
MARKING DEVICE
Filed Feb. 7, 1941　　3 Sheets-Sheet 1
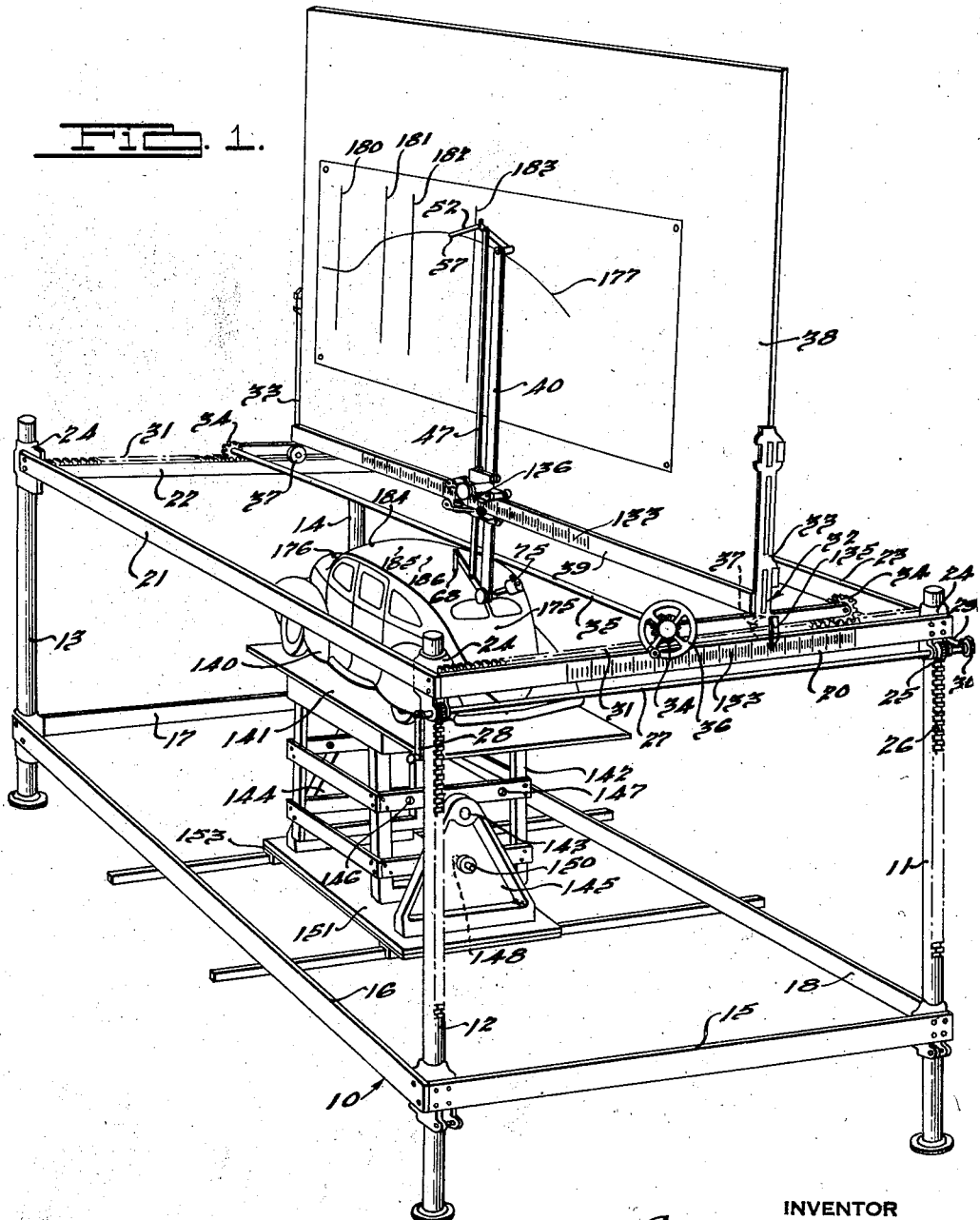
INVENTOR
Cass S. Kasper.
BY
Harness, Dickey & Pierce.
ATTORNEYS.

Dec. 15, 1942.  C. S. KASPER  2,305,167
MARKING DEVICE
Filed Feb. 7, 1941    3 Sheets-Sheet 2
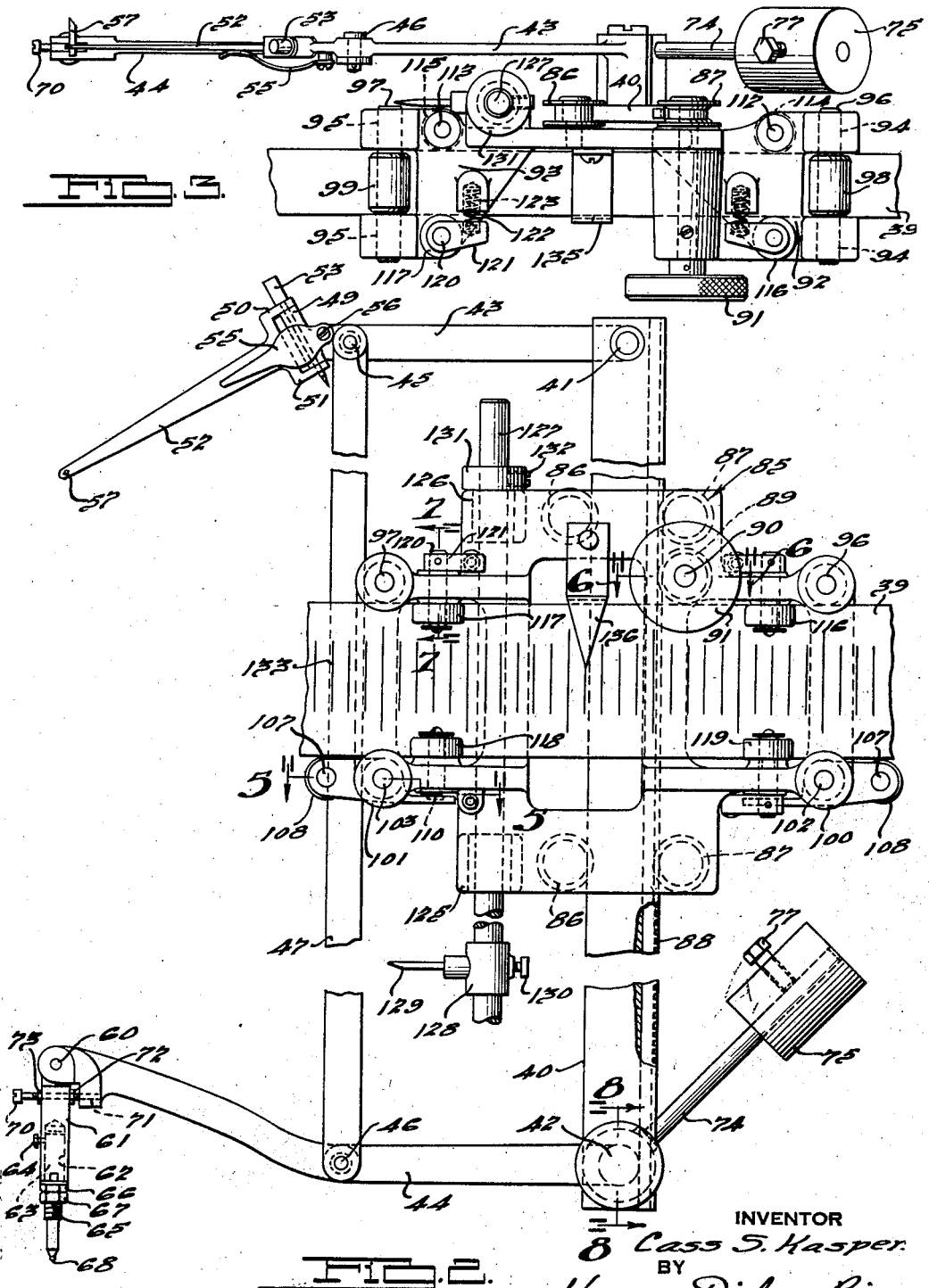

Dec. 15, 1942.  C. S. KASPER  2,305,167
MARKING DEVICE
Filed Feb. 7, 1941  3 Sheets-Sheet 3
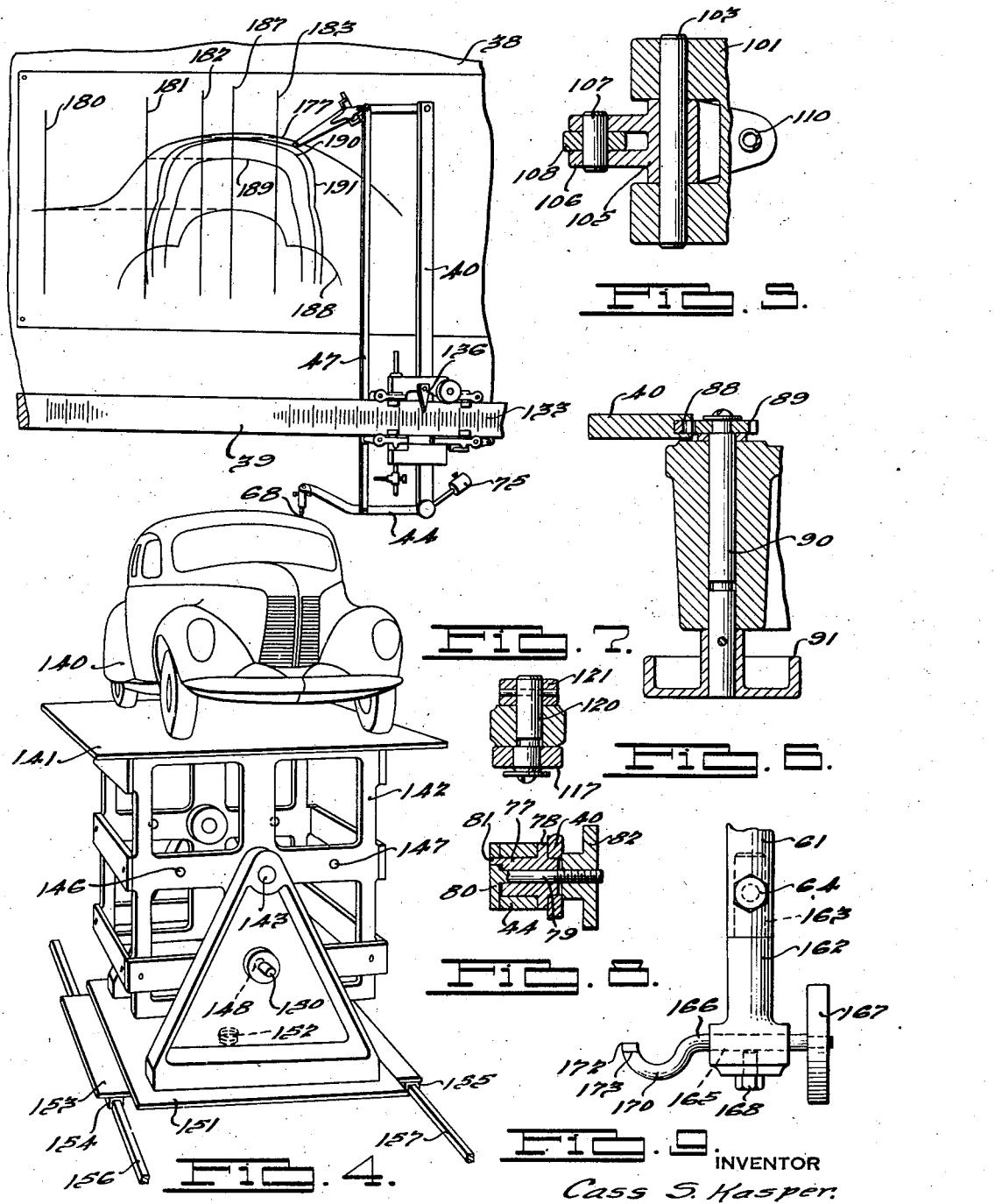
INVENTOR
Cass S. Kasper.
BY
Harness, Dickey & Pierce
ATTORNEYS.

Patented Dec. 15, 1942

2,305,167

UNITED STATES PATENT OFFICE 2,305,167

MARKING DEVICE

Cass S. Kasper, Grosse Pointe, Mich.

Application February 7, 1941, Serial No. 377,919

2 Claims. (Cl. 33—23)

The invention relates generally to marking devices and it has particular relation to a device for reproducing contours on a chart or the like.

In various industries, the reproduction of contours is of considerable importance and as an illustration, reference may be had to the automotive industry. In this instance, it is usual practice to make small, model automobile bodies from clay or other plastics until finally a design or shape of a body is obtained which is satisfying. After so obtaining a satisfactory model, it becomes necessary to lay out the design on working charts from which finally dies may be made. Prior to the present invention, in so far as known, the reproduction of the design on charts and enlarging thereof has been accomplished by tedious measuring and transferring of measurements to charts and usually a completely accurate reproduction did not result.

One object of the present invention is to provide an improved, efficient and easily operable device for reproducing contours, to the end that the work will be greatly simplified while obtaining accurate results.

Another object of the invention is to provide a device of the general character stated which is adapted for use with practically any kind of contour.

Other objects of the invention will become apparent from the following specification, from the drawings relating thereto, and from the claims hereinafter set forth.

For a better understanding of the invention, reference may be had to the drawings, wherein:

Figure 1 is an elevational view illustrating a marking device or apparatus as constructed according to one form of the invention;

Fig. 2 is an enlarged view, partly in section, illustrating particularly the contour following and chart scribing arrangement;

Fig. 3 is a plan view of the construction shown by Fig. 2;

Fig. 4 is a view generally on the order of Fig. 1 and illustrating the procedure of reproducing the contour of a transverse section;

Fig. 5 is a cross-sectional view taken substantially along the line 5—5 of Fig. 2;

Fig. 6 is a cross-sectional view taken substantially along the line 6—6 of Fig. 2;

Fig. 7 is a cross-sectional view taken substantially along the line 7—7 of Fig. 2;

Fig. 8 is a cross-sectional view taken substantially along the line 8—8 of Fig. 2; and Fig. 9 is a detailed view illustrating another form of contour follower which may be used.

Referring to Fig. 1, a frame illustrated at 10 comprises four corner posts 11, 12, 13 and 14 interconnected by lower bars 15, 16, 17 and 18 and upper bars 20, 21, 22 and 23. The upper bars are connected to the posts through heads 24 slidably mounted on the latter and each of these heads has a pinion 25 which meshes with rack teeth 26 on the corresponding post. A shaft 27 having a handle 28 is drivingly connected at its ends to the pinions at one end of the frame and a similar shaft is provided at the opposite end of the frame. A rear shaft 29 and bevel gears 30 interconnect the rear ends of the two shafts and it follows that turning of the crank causes all of the heads 24 and upper bars to move upwardly or downwardly as a unit depending upon direction of crank rotation.

Along the upper end bars 20 and 22, rack bars 31 are provided and these serve to support and guide a carriage 32 including T-shape frame members 33, each provided with pinions 34 engaging the corresponding rack bars. The front pinions 34 are interconnected by a shaft 35 having a hand wheel 36 on one end so that turning of the hand wheel will effect movement of the carriage along the rack bars. Discs 37 on the members 33 and 34 overlap the sides of the rack bars and serve to maintain the pinions in engagement with the rack bars.

A chart-receiving board 38 may be supported by the upright parts of the members 33 and 34 and for rigidly interconnecting the latter members, a bar 29 may be connected at its ends thereto. It may be observed that this bar is spaced substantially from the board 38 and, as will be seen presently, this space permits marking devices to be disposed between the board and the bar.

Now directing attention to Figs. 2 and 3, it may be mentioned first that the contour follower and scriber arrangement is mounted for movement along the bar 39 and also for movement vertically to the bar. The arrangement includes an upright bar 40 pivotally connected at its upper and lower ends as indicated at 41 and 42 to upper and lower arms 43 and 44. These arms intermediate their ends are pivotally interconnected as indicated at 45 and 46 to a link 47 disposed parallel to the bar 40. At its left end, the arm 43 has an oblique apertured portion 49 disposed between bifurcated arms 50 and 51 of a marker arm 52 and a pin 53 pivotally connects the apertured portion 49 with the arms.

For resiliently urging the marker arm in a direction towards the chart, a leaf spring 55 may be fastened to the end of the arm 43 by means of a screw 56 and this spring extends over the marker arm so as to resiliently press against it. The extreme outer end of the marker arm is provided with a tubular pen point of suitable character 57 which is directed transversely to the arm.

The outer end of the lower arm 44 is pivotally connected as indicated at 60 to a holder 61 having an opening 62 for receiving the upper end of a stylus 63 which is retained therein by means of a set screw 64. An external part of the stylus 63 is threaded as indicated at 65 and nuts 66 and 67 provide an adjustable abutment for limiting upward movement of the stylus so that when the stylus is moving over a contour and resting thereon, pressure is taken through the lock nuts. It will be observed that the lower end of the stylus terminates in a rounded or ball point 68 which is small so that there will be little variation in results while still providing a rounded surface for contacting the contour. Pivotal movement of the holder 61 with respect to the pivot 60 is governed by a screw 70 extending loosely through the holder and threaded into the end of the arm 44 as indicated at 71. Lock nuts 72 and 73 disposed at opposite sides of the rod 61 adjustably lock the holder in position.

It may be stated here that the distance between the points 41 and 42, between the pivot points 45 and 46 and between the marker point and stylus point 68, will be equal. Also, the lateral distance between points 41 and 45 and between 42 and 46 will be equal so that a parallelogram is formed. Also, points 57 and 68 are equally spaced from the pivots 45 and 46 and it follows that contour followed by point 68 will be reproduced by marker point 57.

That end of the arm 44 at the pivot 42 is provided with a rod extension 74 having a counterweight 75 adjustable thereon by means of a set screw 77. This counterweight may be adjusted so that it counterbalances the weight of the arms 43 and 44 and link 47, to the end that the pressure of the follower against the contour may be varied.

In order to lock the arms and bars of the parallelogram against relative movement, the pivot 42 is provided with a lock as shown by Fig. 8. As seen in this figure, a bushing 77 rotatably extends through the arm 44 and is press fitted in an opening in the bar 40 and has a collar 78 disposed between them. A pin 79 extending through the bushing and having a head 80 at one end for clamping against the arm 44, is locked against rotation relative to the bushing by means of a projection 81 on the bushing extending into an aperture in the head 80. At its opposite end, the pin has a knob 82 threaded thereon and it follows that tightening of the knob locks the arm 44 and bushing against relative turning. Loosening of the knob allows the arm 44 to turn relative to the bar 40.

For mounting the bar 40 on the bar 39, a carriage 85 is provided which, as best shown by Figures 2 and 3, has upper and lower pairs of grooved rollers 86 and 87 forming a guide for the bar. For vertically moving the bar 40, as best shown by Fig. 6, one edge of the bar is provided with rack teeth 88 which mesh with a pinion 89 secured to a shaft 90. This shaft may be rotated by means of a hand wheel 91 secured to the shaft. While frictional resistance may be obtained to prevent downward movement of the bar and parts carried thereby, except when the wheel 91 is turned, it is evident that a releasable lock may be provided for positively holding the bar against downward movement except when the lock is released.

The carriage 85 at the upper side of the bar 39 has spaced bifurcated ends 92 and 93, the arms of which are apertured as indicated at 94 and 95 for receiving pins 96 and 97. Rollers 98 and 99 disposed respectively between the bifurcated arms and on the pins 96 and 97 have rolling contact with the upper side of the bar 39 and mainly support the carriage thereon.

The carriage 85 is similarly provided with bifurcated portions 100 and 101 at the lower side of the bar 37 and similarly pins 102 and 103 extend through the apertures. As best shown by Fig. 5, a bellcrank 105 is turnably mounted on each pin between the bifurcated arms and one end of this bellcrank is in turn bifurcated as indicated at 106 with the bifurcated arm apertured and receiving a pin 107. A roller 108 mounted between the bifurcated arms and on the pin 107 is adapted to engage the under side of the bar 39. The opposite end of the bellcrank 105 is urged downwardly by means of a spring 110 which is seated in a recess in a portion of the carriage at the under side of the bar 39.

For contacting the back side of the bar 39, as shown by Fig. 3, the carriage is provided with upper and lower pairs of vertically extending pins 112 and 113 which have upper and lower pairs of rollers 114 and 115 thereon adapted to contact the back side of the bar. At the front side of the bar, as seen in Fig. 2, rollers 116, 117, 118, and 119 are resiliently held against the front surface of the bar and since these are all alike, only one need be described. Referring in this connection to Fig. 7, it will be noted that the frame of the carriage has a pin 120 carrying the roller 117 and that the axis of the roller is slightly eccentric to the axis of the pin body. The opposite end of the pin, as shown by Fig. 3, has an arm 121 secured thereto and this arm engages a spring 122 seated in a recess 123 in the carriage frame. Thus, the spring urges the arm 117 about the axis of the pin 120, and it will be apparent that the roller 117, due to its eccentric mounting, will be resiliently urged into contact with the front face of the arm 39.

From the foregoing it will be appreciated that the carriage is held closely against all sides of the bar 39 while being permitted to move easily along the bar.

It may be mentioned in connection with Figs. 2 and 3 that the carriage at the rear side of the bar 39 is provided with upper and lower apertured bosses 125 and 126 which receive a vertically disposed rod 127 adjustably carrying a holder 128 having a scriber 129 thereon. The position of this holder on the rod may be adjusted by means of a set screw 130 and the position of the rod vertically with respect to the carriage may be adjusted by means of a collar 131 at the upper side of the carriage which is adjustably secured to the rod by means of a set screw 132.

This device serves as a means for balancing the model relative to the chart and placing construction lines on the model. It will be understood that the carriage and scriber may be moved along the bar 39 or the carriage 32 can be moved along the rack bars 31. Measuring scales 133 and 134 may be provided on the end bar 29 and on the bar 39, respectively, to facilitate this procedure and also to facilitate determination of center points on the model. Pointers 135 and 136 on the frame member 33 and on the carriage 85 cooperate with the scales.

Now referring to Figs. 1 and 4, the model whose contour is to be reproduced is indicated at 140 and it may be secured to a plate 141 in any suitable manner. The plate 141 is fastened to a box-like frame 142 which is pivotally mounted as indicated at 143 on spaced triangular supports 144 and 145. Openings 146, 147, and 148 in a part of the frame 142 are adapted selectively to receive a pin 148 in the triangular support 145, and these openings may be so located that the box-like frame may be held in the position shown or turned through 90° and then locked in its new position, or openings may be provided to allow turning the frame through any other given angles and then locking it in position.

The supports 144 and 145 are mounted on a second plate 151 which, as best shown by Fig. 4, is turnably mounted on a pin 152 projecting upwardly from a lower plate 153. This lower plate has guide elements 154 and 155 movably mounted on tracks 156 and 157.

It should now be apparent that the entire model supporting structure may be moved longitudinally of the tracks 156 and 157, that the structure may be turned about a vertically extending axis, and that finally it may be turned about a horizontally extending axis. Hence, the model may be positioned as shown, or on either of its sides at any specified angle, and it may be swung about a vertical axis into any position desired.

Now referring to Figure 9, a different form of stylus is provided which is adapted to be secured to the rod 61. In this case, a member 162 is provided which has an extension 163 adapted to be held in the rod 61 by the set screw 64. The lower end of the member 162 is apertured as indicated at 165 and receives a stylus 166 adapted to turn therein and which may be turned by means of a hand wheel 167. A set screw 168 is provided for locking the stylus in a desired position and by loosening the set screw the follower may be turned and also moved axially. The end of the follower is curved as indicated at 170 and terminated in a wedge shape end 171 which forms a point 172 adapted to contact the contour. It may be observed that this point is on the axis of rotation of the stylus so that the point always remains in the same position on this axis either during turning or axial movement. It will be evident that by turning the handle 167, access may be had to recesses, etc., since the curved part 170 allows the point to move into clockwise inaccessible places. It is to be understood that the axis of the member 166 will normally be located perpendicularly to the chart.

With reference to Fig. 1 and as an illustration of one way of using the invention, lateral center points 175 and 176 at the front and rear of the model 140 may be obtained by suitable instruments and then, while holding the pen 57 away from the chart, the stylus 68 may be moved over the model and the latter adjusted, if necessary, until the points 175 and 176 are parallel to the bar 39. When this occurs, the pen 57 is allowed to press against the chart and the stylus is moved longitudinally over the model and through points 175 and 176 to obtain the longitudinal section line 177. Following this, the stylus may be moved to the center of the front hub cap, the parallelogram then locked and then the bar 40 may be moved vertically to obtain the front wheel center line indicated at 180. Then other lines may be drawn parallel to center line 181, as indicated at 181, 182 and 183 and the operator will make a mark on the model at the points 184, 185, 186 from which these additional lines are derived. As many of these lines may be made as desired.

Then with reference to Fig. 4, the model is swung through 90° and this may be accurately determined by aligning the center points of the hubs by means of the stylus. Following this, a center line 187 may be drawn to represent the longitudinal center of the car and this may be located by first locating the stylus on a lateral center of the model. Then the stylus may be moved over the front wheel center line contour of the model to trace out the contour line 188 and then contours 189, 190, 191 of sections at the lines 181, 182 and 183 or points 184, 185 and 186 may be drawn. It will be seen from this that the sectional contour at any point may be accurately determined and laid out with no difficulty and along a center line showing the contours in true relation to each other and to the lateral and longitudinal center lines of the car. The instrument as shown duplicates a one to one ratio.

If desired, a pantograph may be coupled to the scriber point 57 to obtain any ratio contour lines desired.

It is evident that the apparatus is adapted for varying use and that it may be adjusted and maneuvered through practically any movement and direction desired.

While more than one form of the invention has been described and illustrated in detail, it will be apparent to those skilled in the art that varying modifications may be made without departing from the spirit of the invention.

What is claimed is:

1. Apparatus for reproducing contours comprising a pair of oppositely disposed bars and a pair of oppositely disposed arms pivotally connected to form a parallelogram, scriber means on one of the arms, contour following means on the other arm, a carriage, means for supporting and guiding one of the bars on the carriage for movement in one direction, a second carriage movably supporting the first carriage for movement in a direction transversely to said one direction, and means supporting and guiding the second carriage for movement transversely to both of the aforementioned directions.

2. Apparatus for reproducing contours comprising a pair of oppositely disposed bars and a pair of oppositely disposed arms pivotally connected to form a parallelogram, scriber means on one of the arms, contour following means on the other arm, a carriage, means for supporting and guiding one of the bars on the carriage for movement longitudinally of the bar, means including a rack and pinion for moving the bar on said supporting and guiding means and for holding it in adjusted positions, an elongated supporting and guiding member, and means supporting the carriage on said member for movement transversely to said one direction.

CASS S. KASPER.